United States Patent Office 3,222,188
Patented Dec. 7, 1965

3,222,188
FOOD CONTAINER MADE OF SYNTHETIC RESIN AND HAVING ITS INNER SURFACE MODIFIED BY TREATMENT WITH AN ELECTRIC DISCHARGE
Peter Blandford Feldman, Broom Hill, Stoke Poges, England, assignor to Monsanto Chemicals Limited, London, England, a British company
No Drawing. Filed Apr. 24, 1962, Ser. No. 189,706
Claims priority, application Great Britain, May 26, 1961, 19,050/61
11 Claims. (Cl. 99—171)

The invention relates to containers, and especially to containers for foods such as jam, jelly and syrup.

Many foods such as jam, jelly and syrup belong to the class of foods known as "hot-filled" products; that is, they are packed into the containers in which they are to be sold while they are still hot, and the containers are then sealed and cooled. Traditionally such products have been sold in containers made of glass or metal, but recently attempts have been made to use for this purpose containers made of thermoplastic materials, especially synthetic thermoplastic resins such as polystyrene. Such containers are less brittle than glass, and they are light in weight. A difficulty is encountered in such use, however, in that unsightly air bubbles form between the inner surface of the container and its contents. This difficulty has in fact until now proved difficult to solve and has greatly hindered the adoption for this purpose of containers made of these new materials.

There has now been found a method by which the inside surface of a synthetic resin container can be modified as that when the container is filled with jam, syrup and other hot-filled edible substances there is a much reduced tendency for the formation of bubbles on the inside surface of the container.

The invention accordingly comprises a thermoplastic synthetic resin container filled with jam, jelly or other hot-filled edible substance, in which the inner surface of the container with which the jam or other substance is in direct contact has been subjected to an electric discharge prior to the container being filled.

Also included within the invention is a process in which the inside surface of a container made from a thermoplastic styrene polymer is subjected to an electric discharge, so that when the container is filled with jam, jelly, syrup or other hot-filled edible substance any tendency for bubbles to appear on the inside surface is substantially reduced.

The container which is surface-modified in accordance with the present invention can be any thermoplastic synthetic resin container which normally suffers from the above disadvantage, e.g., polyethylene, etc., but the process of the invention is especially useful when applied to containers made of a thermoplastic styrene polymer. Typical examples of thermoplastic styrene polymers used in making such containers are polystyrene, copolymers of styrene with a lesser amount of one or more copolymerizable monomers (e.g., alkyl- or halo-substituted styrenes, such as o-, m-, and p-methylstyrenes, alpha-methylstyrene, ar-ethylstyrenes, p-bromostyrene, 2,4-dichlorostyrene, etc.; conjugated 1,3-dienes, such as butadiene, isoprene, etc.; acrylic compounds, such as acrylic acid, acrylonitrile, acrylamide, methyl acrylate, 2-ethylhexyl acrylate, and other alkyl acrylates; the corresponding methacrylic compounds, etc.), rubber-modified styrene polymers obtained by blending a natural or synthetic rubber with a preformed polystyrene or styrene copolymer or by polymerizing styrene or a styrene-comonomer mixture containing a dissolved natural or synthetic rubber, etc. According to a preferred embodiment of the invention, the container is made of heat-resistant polystyrene, i.e., polystyrene having a heat distortion temperature higher than 90° C.

Methods of forming thermoplastic synthetic resin containers are well known, of course, and do not constitute a point of novelty of the present invention. Among the known forming techniques are injection molding, vacuum forming (e.g., vacuum forming of a biaxially-oriented polystyrene sheet), etc.

The electric discharge applied will normally be one of a high voltage, especially for instance above 3,000 volts, and particularly from 4,000 to 30,000 volts. From 7,500 to 15,000 volts is usually suitable. The voltage is preferably an alternating one, especially one having a frequency of from 1,000 to 100,000 cycles per second. The discharge is preferably a corona discharge, but can be in the form of a spark or spray discharge.

The discharge is applied between suitable electrodes, placed respectively inside and outside the container. The outer electrode is preferably in contact with the resin surface. The distance of the inner electrode from the resin surface is chosen so that it is close enough for the discharge to take place, but far enough away for the effect on the surface to be even. Generally from 0.005 inch to 0.05 inch, and especially from 0.01 inch, is a suitable distance.

The time during which the electric discharge is allowed to act upon the interior surface of the container depends on several factors, including for example the voltage of the discharge and the proximity of the electrode to the surface, but in general it will be found that if the discharge is allowed to act for 0.003 to 1 second, and especially for from 0.01 to 0.5 second, the results of the treatment will be satisfactory.

In carrying out the process of the invention, the container, especially if it is one having a circular cross-section, can be placed inside a hollow electrode, another electrode being placed inside the container near the interior surface. The container is then rotated through 360° while the source of electricity is switched on, the speed of rotation being chosen so that each portion of the interior surface is acted on by the discharge for a suitable time.

The invention is illustrated by the following example.

*Example*

This example describes the production of a heat-resistance polystyrene container according to the process of the invention.

A cylindrical container having a wall thickness of 0.05 inch and a capacity of 12 fluid ounces was nijection molded from heat-resistant polystyrene. The container was then placed inside a close fitting cylindrical brass electrode mounted on a rotatable horizontal platform, and a wire electrode was placed vertically inside the container at a distance of 0.015 inch from the container wall. The electrodes were connected to the secondary terminals of a transformer capable of supplying electricity at an alternatnig voltage of 10,000 voltes and 3 kilocycles per second. The container was rotated once through 360° at a speed of 80 revolutions per minute while the electricity was switched on.

The electricity was switched off, and the container removed from the turntable and filled with hot jam. It was found that the jam spread evenly over the inside surfaec of the container, and after cooling there were found to be no bubbles or voids at the jam/polystyrene interface.

For the purpose of comparison, a similar container which had not been subjected to electrical treatment was also filled with hot jam, and in this case it was found that a large number of bubbles appeared on the inside surface of the container after the jam had cooled.

What is claimed is:

1. A thermoplastic synthetic resin container containing a hot-filled edible material in direct contact with its inner surface, said inner surface having been subjected to an electric discharge prior to being contacted with the hot edible material.

2. A container as in claim 1 wherein the thermoplasitc synthetic resin is a thermoplastic styrene polymer.

3. A container as in claim 1 wherein the thermoplastic synthetic resin is a heat-resistant polystyrene.

4. A container as in claim 1 wherein the inner surface has been subjected to an electric discharge of 7,500–15,000 volts.

5. A container as in claim 1 wherein the inner surface has been subjected to an electric discharge for 0.01–0.5 second.

6. A process which consists of subjecting the inner surface of a thermoplastic synthetic resin container to an electric discharge and subsequently filling the container with a hot edible material.

7. A process as in claim 6 wherein the container is made of a thermoplastic styrene polymer.

8. A process as in claim 6 wherein the container is a heat-resistant polystyrene container.

9. A process as in claim 6 wherein the electric discharge is one of 7,500–15,000 volts.

10. A process as in claim 6 wherein the inner surface of the container is subjected to an electric discharge for 0.01–0.5 second.

11. A process which consists of placing a thermoplastic styrene polymer container having a circular cross-section inside a hollow electrode, placing another electrode inside the container near the inner surface, rotating the container through 360° while an electric discharge is acting on the inner surface of the container, and subsequently filling the container with a hot edible material.

References Cited by the Examiner

UNITED STATES PATENTS

| | | | |
|---|---|---|---|
| 2,816,837 | 12/1957 | Holsman | 99—182 |
| 2,876,358 | 5/1959 | Root | 204—325 |
| 3,017,339 | 1/1962 | Dewey | 204—165 |
| 3,021,270 | 2/1962 | Tarbox et al. | 204—168 |
| 3,057,795 | 10/1962 | Frohlich | 204—312 |
| 3,108,881 | 10/1963 | Shaw et al. | 99—182 |

JOHN H. MACK, *Primary Examiner.*

JOHN R. SPECK, *Examiner.*